US007085610B2

(12) United States Patent
Eryurek et al.

(10) Patent No.: US 7,085,610 B2
(45) Date of Patent: Aug. 1, 2006

(54) ROOT CAUSE DIAGNOSTICS (75) Inventors: Evren Eryurek, Minneapolis, MN (US); Kadir Kavaklioglu, Edina, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 660 days.

(21) Appl. No.: 09/972,078

(22) Filed: Oct. 5, 2001

(65) Prior Publication Data

US 2002/0038156 A1    Mar. 28, 2002

Related U.S. Application Data

(60) Continuation-in-part of application No. 09/303,869, filed on May 3, 1999, now Pat. No. 6,397,114, which is a division of application No. 08/623,569, filed on Mar. 28, 1996, now Pat. No. 6,017,143.

(51) Int. Cl.
*G05B 13/02* (2006.01)
(52) U.S. Cl. ............................. 700/29; 700/51; 700/32; 702/183; 702/33; 702/59; 714/735
(58) Field of Classification Search ............ 700/48–50, 700/51; 702/183, 33, 59; 706/2–8
See application file for complete search history.

(56) References Cited

U.S. PATENT DOCUMENTS

| 3,096,434 | A | 7/1963 | King ........................ 235/151 |
|---|---|---|---|
| 3,404,264 | A | 10/1968 | Kugler ..................... 235/194 |
| 3,468,164 | A | 9/1969 | Sutherland .................. 73/343 |
| 3,590,370 | A | 6/1971 | Fleischer ................... 324/51 |
| 3,618,592 | A | 11/1971 | Stewart et al. .............. 128/2.05 |
| 3,688,190 | A | 8/1972 | Blum ...................... 324/61 R |
| 3,691,842 | A | 9/1972 | Akeley ..................... 73/398 |
| 3,701,280 | A | 10/1972 | Stroman .................... 73/194 |
| 3,849,637 | A | 11/1974 | Caruso et al. ............. 235/151 |
| 3,855,858 | A | 12/1974 | Cushing .................... 73/194 |
| 3,952,759 | A | 4/1976 | Ottenstein .................. 137/12 |
| 3,973,184 | A | 8/1976 | Raber ...................... 324/51 |
| RE29,383 | E | 9/1977 | Gallatin et al. ............. 137/14 |
| 4,058,975 | A | 11/1977 | Gilbert et al. ............. 60/39.28 |
| 4,099,413 | A | 7/1978 | Ohte et al. ................. 73/359 |
| 4,102,199 | A | 7/1978 | Talpouras .................. 73/362 |
| 4,122,719 | A | 10/1978 | Carlson et al. .............. 73/342 |

(Continued)

FOREIGN PATENT DOCUMENTS

DE         32 13 866 A1    10/1983

(Continued)

OTHER PUBLICATIONS

Journal of Intelligent Manufacturing (1997) 8, 271-276 article entitled "On-line tool condition monitoring system with wavelet fuzzy neural network".

(Continued)

*Primary Examiner*—Anthony Knight
*Assistant Examiner*—Michael B. Holmes
(74) *Attorney, Agent, or Firm*—Westman, Champlin & Kelly, P.A.

(57) ABSTRACT

An industrial process diagnostic apparatus is provided which can identify a source, or "root cause", of an aberration in an industrial process. A plurality of process configuration models are provided which each represent a physical (or actual) implementation of an industrial process. One of the plurality of models is selected and diagnostics performed on the process using the selected model and at least one process signal related to the process. Based upon the diagnostics, a root cause of the aberration is determined.

31 Claims, 4 Drawing Sheets

U.S. PATENT DOCUMENTS

| | | | |
|---|---|---|---|
| 4,249,164 A | 2/1981 | Tivy | 340/870.3 |
| 4,250,490 A | 2/1981 | Dahlke | 340/870.37 |
| 4,279,013 A | 7/1981 | Cameron et al. | 364/105 |
| 4,337,516 A | 6/1982 | Murphy et al. | |
| 4,399,824 A | 8/1983 | Davidson | 128/736 |
| 4,417,312 A | 11/1983 | Cronin et al. | 364/510 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,571,689 A | 2/1986 | Hildebrand et al. | |
| 4,635,214 A | 1/1987 | Kasai et al. | |
| 4,642,782 A | 2/1987 | Kemper et al. | |
| 4,644,479 A | 2/1987 | Kemper et al. | |
| 4,649,515 A | 3/1987 | Thompson et al. | |
| 4,668,473 A | 5/1987 | Agarwal | 422/62 |
| 4,707,796 A | 11/1987 | Calabro et al. | |
| 4,720,806 A | 1/1988 | Schippers et al. | |
| 4,736,367 A | 4/1988 | Wroblewski et al. | 370/85 |
| 4,736,763 A | 4/1988 | Britton et al. | 137/10 |
| 4,777,585 A | 10/1988 | Kokawa et al. | |
| 4,807,151 A | 2/1989 | Citron | 364/510 |
| 4,818,994 A | 4/1989 | Orth et al. | 340/870.21 |
| 4,831,564 A | 5/1989 | Suga | |
| 4,841,286 A | 6/1989 | Kummer | 340/653 |
| 4,853,693 A | 8/1989 | Eaton-Williams | 340/588 |
| 4,873,655 A | 10/1989 | Kondraske | |
| 4,907,167 A | 3/1990 | Skeirik | |
| 4,924,418 A | 5/1990 | Backman et al. | |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | |
| 5,005,142 A | 4/1991 | Lipchak et al. | |
| 5,019,760 A | 5/1991 | Chu et al. | 318/490 |
| 5,043,862 A | 8/1991 | Takahashi et al. | |
| 5,053,815 A | 10/1991 | Wendell | 355/208 |
| 5,067,099 A | 11/1991 | McCown et al. | |
| 5,081,598 A | 1/1992 | Bellows et al. | |
| 5,089,979 A | 2/1992 | McEachern et al. | |
| 5,089,984 A | 2/1992 | Struger et al. | |
| 5,098,197 A | 3/1992 | Shepard et al. | 374/120 |
| 5,099,436 A | 3/1992 | McCown et al. | |
| 5,103,409 A | 4/1992 | Shimizu et al. | |
| 5,111,531 A | 5/1992 | Grayson et al. | |
| 5,121,467 A | 6/1992 | Skeirik | |
| 5,122,794 A | 6/1992 | Warrior | 340/825.2 |
| 5,122,976 A | 6/1992 | Bellows et al. | |
| 5,130,936 A | 7/1992 | Sheppard et al. | |
| 5,134,574 A | 7/1992 | Beaverstock et al. | |
| 5,137,370 A | 8/1992 | McCullock et al. | 374/173 |
| 5,142,612 A | 8/1992 | Skeirik | |
| 5,143,452 A | 9/1992 | Maxedon et al. | 374/170 |
| 5,148,378 A | 9/1992 | Shibayama et al. | |
| 5,167,009 A | 11/1992 | Skeirik | |
| 5,175,678 A | 12/1992 | Frerichs et al. | |
| 5,193,143 A | 3/1993 | Kaemmerer et al. | |
| 5,197,114 A | 3/1993 | Skeirik | |
| 5,197,328 A | 3/1993 | Fitzgerald | 73/168 |
| 5,212,765 A | 5/1993 | Skeirik | |
| 5,214,582 A | 5/1993 | Gray | |
| 5,224,203 A | 6/1993 | Skeirik | |
| 5,228,780 A | 7/1993 | Shepard et al. | 374/175 |
| 5,235,527 A | 8/1993 | Ogawa et al. | |
| 5,265,031 A | 11/1993 | Malczewski | |
| 5,265,222 A | 11/1993 | Nishiya et al. | |
| 5,269,311 A | 12/1993 | Kirchner et al. | 128/672 |
| 5,274,572 A | 12/1993 | O'Neill et al. | |
| 5,282,131 A | 1/1994 | Rudd et al. | |
| 5,282,261 A | 1/1994 | Skeirik | |
| 5,293,585 A | 3/1994 | Morita | |
| 5,303,181 A | 4/1994 | Stockton | 365/96 |
| 5,305,230 A | 4/1994 | Matsumoto et al. | |
| 5,311,421 A | 5/1994 | Nomura et al. | |
| 5,317,520 A | 5/1994 | Castle | |
| 5,327,357 A | 7/1994 | Feinstein et al. | |
| 5,333,240 A * | 7/1994 | Matsumoto et al. | 706/20 |
| 5,347,843 A | 9/1994 | Orr et al. | 73/3 |
| 5,349,541 A | 9/1994 | Alexandro, Jr. et al. | |
| 5,357,449 A | 10/1994 | Oh | |
| 5,361,628 A | 11/1994 | Marko et al. | 73/116 |
| 5,365,423 A | 11/1994 | Chand | |
| 5,365,787 A | 11/1994 | Hernandez et al. | 73/660 |
| 5,367,612 A | 11/1994 | Bozich et al. | |
| 5,384,699 A | 1/1995 | Levy et al. | |
| 5,386,373 A | 1/1995 | Keeler et al. | |
| 5,388,465 A | 2/1995 | Okaniwa et al. | 73/861.17 |
| 5,394,341 A | 2/1995 | Kepner | |
| 5,394,543 A | 2/1995 | Hill et al. | |
| 5,404,064 A | 4/1995 | Mermelstein et al. | 310/319 |
| 5,408,406 A | 4/1995 | Mathur et al. | |
| 5,408,586 A | 4/1995 | Skeirik | |
| 5,414,645 A | 5/1995 | Hirano | |
| 5,419,197 A | 5/1995 | Ogi et al. | 73/659 |
| 5,430,642 A | 7/1995 | Nakajima et al. | |
| 5,434,774 A | 7/1995 | Seberger | 364/172 |
| 5,436,705 A | 7/1995 | Raj | 355/246 |
| 5,440,478 A | 8/1995 | Fisher et al. | |
| 5,442,639 A | 8/1995 | Crowder et al. | 371/20.1 |
| 5,467,355 A | 11/1995 | Umeda et al. | |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | |
| 5,488,697 A | 1/1996 | Kaemmerer et al. | |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | |
| 5,526,293 A | 6/1996 | Mozumder et al. | |
| 5,539,638 A | 7/1996 | Keeler et al. | |
| 5,548,528 A | 8/1996 | Keeler et al. | |
| 5,560,246 A | 10/1996 | Bottinger et al. | 73/861.15 |
| 5,561,599 A | 10/1996 | Lu | |
| 5,570,300 A | 10/1996 | Henry et al. | |
| 5,572,420 A | 11/1996 | Lu | |
| 5,573,032 A | 11/1996 | Lenz et al. | 137/486 |
| 5,591,922 A | 1/1997 | Segeral et al. | 73/861.04 |
| 5,598,521 A | 1/1997 | Kilgore et al. | |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | |
| 5,633,809 A | 5/1997 | Wissenbach et al. | |
| 5,637,802 A | 6/1997 | Frick et al. | 73/724 |
| 5,640,491 A | 6/1997 | Bhat et al. | |
| 5,661,668 A | 8/1997 | Yemini et al. | |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | |
| 5,675,504 A | 10/1997 | Serodes et al. | |
| 5,675,724 A | 10/1997 | Beal et al. | |
| 5,680,109 A | 10/1997 | Lowe et al. | 340/608 |
| 5,682,317 A | 10/1997 | Keeler et al. | 364/431.03 |
| 5,700,090 A | 12/1997 | Eryurek | 374/210 |
| 5,703,575 A | 12/1997 | Kirpatrick | 340/870.17 |
| 5,704,011 A | 12/1997 | Hansen et al. | |
| 5,705,978 A | 1/1998 | Frick et al. | 340/511 |
| 5,708,211 A | 1/1998 | Jepson et al. | 73/861.04 |
| 5,708,585 A | 1/1998 | Kushion | |
| 5,710,370 A | 1/1998 | Shanahan et al. | 73/1.35 |

| | | | |
|---|---|---|---|
| 5,713,668 A | 2/1998 | Lunghofer et al. ......... 374/179 |
| 5,719,378 A | 2/1998 | Jackson, Jr. et al. ........ 219/497 |
| 5,736,649 A | 4/1998 | Kawasaki et al. ....... 73/861.23 |
| 5,741,074 A | 4/1998 | Wang et al. ................. 374/185 |
| 5,742,845 A | 4/1998 | Wagner |
| 5,746,511 A | 5/1998 | Eryurek et al. ................. 374/2 |
| 5,747,701 A | 5/1998 | Marsh et al. ............ 73/861.23 |
| 5,752,008 A | 5/1998 | Bowling |
| 5,764,891 A | 6/1998 | Warrior |
| 5,781,878 A | 7/1998 | Mizoguchi et al. ......... 701/109 |
| 5,801,689 A | 9/1998 | Huntsman ................... 345/329 |
| 5,805,442 A | 9/1998 | Crater et al. |
| 5,817,950 A | 10/1998 | Wiklund et al. ......... 73/861.66 |
| 5,828,567 A | 10/1998 | Eryurek et al. ............. 364/184 |
| 5,829,876 A | 11/1998 | Schwartz et al. ............... 374/1 |
| 5,848,383 A | 12/1998 | Yuuns ........................ 702/102 |
| 5,859,964 A | 1/1999 | Wang et al. |
| 5,876,122 A | 3/1999 | Eryurek ...................... 374/183 |
| 5,880,376 A | 3/1999 | Sai et al. ................. 73/861.08 |
| 5,887,978 A | 3/1999 | Lunghofer et al. ......... 374/179 |
| 5,908,990 A | 6/1999 | Cummings ............... 73/861.22 |
| 5,923,557 A | 7/1999 | Eidson |
| 5,924,086 A | 7/1999 | Mathur et al. ................. 706/25 |
| 5,926,778 A | 7/1999 | Pöppel ....................... 702/130 |
| 5,936,514 A | 8/1999 | Anderson et al. ...... 340/310.01 |
| 5,940,290 A | 8/1999 | Dixon |
| 5,956,663 A | 9/1999 | Eryurek et al. ............. 702/183 |
| 5,970,430 A | 10/1999 | Burns et al. ................. 702/122 |
| 6,014,902 A | 1/2000 | Lewis et al. ............. 73/861.12 |
| 6,016,523 A | 1/2000 | Zimmerman et al. ......... 710/63 |
| 6,016,706 A | 1/2000 | Yamamoto et al. ................. 9/6 |
| 6,017,143 A | 1/2000 | Eryurek et al. ............... 700/51 |
| 6,023,399 A | 2/2000 | Kogure ........................ 361/23 |
| 6,038,579 A | 3/2000 | Sekine ....................... 708/400 |
| 6,045,260 A | 4/2000 | Schwartz et al. ........... 374/183 |
| 6,047,220 A | 4/2000 | Eryurek et al. ............... 700/28 |
| 6,047,222 A | 4/2000 | Burns et al. ................... 700/79 |
| 6,052,655 A | 4/2000 | Kobayashi et al. ......... 702/184 |
| 6,072,150 A | 6/2000 | Sheffer .................. 219/121.83 |
| 6,112,131 A | 8/2000 | Ghorashi et al. ........... 700/142 |
| 6,119,047 A | 9/2000 | Eryurek et al. ............... 700/28 |
| 6,119,529 A | 9/2000 | DiMarco et al. ......... 73/861.68 |
| 6,139,180 A | 10/2000 | Usher et al. .................... 374/1 |
| 6,151,560 A | 11/2000 | Jones .......................... 702/58 |
| 6,192,281 B1 | 2/2001 | Brown et al. ................... 700/2 |
| 6,195,591 B1 | 2/2001 | Nixon et al. .................... 700/2 |
| 6,199,018 B1 | 3/2001 | Quist et al. ................... 702/34 |
| 6,236,948 B1 | 5/2001 | Eck et al. ..................... 702/45 |
| 6,263,487 B1 | 7/2001 | Stripf et al. .................... 717/1 |
| 6,298,377 B1 | 10/2001 | Hartikainen et al. ........ 709/223 |
| 6,311,136 B1 | 10/2001 | Henry et al. .................. 702/45 |
| 6,327,914 B1 | 12/2001 | Dutton .................. 73/861.356 |
| 6,347,252 B1 | 2/2002 | Behr et al. ...................... 700/3 |
| 6,360,277 B1 | 3/2002 | Ruckley et al. ............. 709/250 |
| 6,370,448 B1 | 4/2002 | Eryurek ....................... 700/282 |
| 6,397,114 B1 | 5/2002 | Eryurek et al. ............... 700/51 |
| 6,425,038 B1 | 7/2002 | Sprecher ..................... 710/269 |

FOREIGN PATENT DOCUMENTS

| | | | |
|---|---|---|---|
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| DE | 100 36 971 A1 | 2/2002 |
| EP | 0 122 622 A1 | 10/1984 |
| EP | 0 413 814 A1 | 2/1991 |
| EP | 0 487 419 A2 | 5/1992 |
| EP | 0 512 794 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| EP | 1022626 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| GB | 2342453 | 4/2000 |
| GB | 2347232 | 8/2000 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-1914 | 1/1989 |
| JP | 64-72699 | 3/1989 |
| JP | 2-5105 | 1/1990 |
| JP | 03229124 | 11/1991 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/01213 A1 | 1/2001 |
| WO | WO 01/77766 | 10/2001 |
| WO | WO 02/27418 | 4/2002 |

OTHER PUBLICATIONS

IEEE Transactions on Magnetics, vol. 34, No. 5, Sep. 1998, "Optical Design of the Coils of an Electromagnetic Flow Meter," pp. 2563-2566.

IEEE Transactions on Magnetics, vol. 30, No. 2, Mar. 1994, "Magnetic Fluid Flow Meter for Gases," pp. 936-938.

IEEE Instrumentation and Measurement, "New approach to a main error estimation for primary transducer of electromagnetic flow meter," pp. 1093-1097.

"Additional Information From Flowmeters via Signal Analysis," by J.E. Amadi-Echendu and E.H. Higham, pp. 187-193.

"Notification of Transmittal of the International Search Report or the Declaration " for PCT/US01/40791.

"Notification of Transmittal of the International Search Report or the Declaration " for PCT/US01/40782.

International Search Report for International Application No. PCT/US 02/14560, issued May 8, 2002. Report dated Sep. 3, 2002.

International Search Report for International Application No. PCT/US 02/14934, issued May 8, 2002. Report dated Aug. 28, 2002.

"A TCP\IP Tutorial " by, Socolofsky et al., Spider Systems Limited, Jan. 1991 pp. 1-23.

"Approval Standards For Explosionproof Electrical Equipment General Requirements", Factory Mutual Research, Cl. No. 3615, Mar. 1989, pp. 1-34.

"Approval Standard Intrinsically Safe Apparatus and Associated Apparatus For Use In Class I, II, and III, Division 1 Hazárdous (Classified) Locations", Factory Mutual Research, Cl. No. 3610, Oct. 1988, pp. 1-70.

"Automation On-line" by, Phillips et al., Plant Services, Jul. 1997, pp. 41-45.

"Climb to New Heights by Controlling your PLCs Over the Internet" by, Phillips et al., Intech, Aug. 1998, pp. 50-51.

"CompProcessor For Piezoresistive Sensors" MCA Technologies Inc. (MCA7707) , pp. 1-8.

"Ethernet emerges as viable, inexpensive fieldbus", Paul G. Schreier, Personal Engineering, Dec. 1997, p. 23-29.

"Ethernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50. Feb. 1992, pp. 1-93.

"Fieldbus Standard for Use in Industrial Control Systems Part 3: Data Link Service Definition", ISA-S50.2-1997, Part 3, Aug. 1997, pp. 1-159.

Fieldbus Standard For Use in Industrial Control Systems Part 4: Data Link Protocol Specification, ISA-S50.02-1997, Part 4, Aug. 1997, pp. 1-148.

"Fieldbus Support For Process Analysis" by, Blevins et al., Fisher-Rosemount Systems, Inc., 1995, pp. 121-128.

"Fieldbus Technical Overview Understanding FOUNDATION™ fieldbus technology", Fisher-Rosemount, 1998, pp. 1-23.

"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Technology Adoption into Automation" by, Fondl et al., Automation Business, pp. 1-5.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There A Future For Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI And Browser For Embedded Web Devices" by, Tom Williams, pp. 1-2.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-78.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C& I*, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4.

"Application of Neural Computing Paradigms for Signal Validation," by B.R. Upadhyaya et al., *Department of Nuclear Engineering*, pp. 1-18.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600° C", by M.J. de Groot et al., *CAL LAB*, Jul./Aug. 1996, pp. 38-41.

"Survey, Applications, And Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, 3rd Edition, p. 124.
"Internal Statistical Quality Control for Quality Monitoring Instruments", by P. Girling et al., *ISA*, 15 pgs., 1999.
Web Pages from www.triant.com (3 pgs.).
"Statistical Process Control (Practice Guide Series Book)", *Instrument Society of America*, 1995, pp. 1-58 and 169-204.
"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).
"Transient Pressure Signals in Mechanical Heart Valve Caviation," Z.J. Wu et al., pp. M555-M561 (undated).
"Caviation in Pumps, Pipes and Valves," *Process Engineering*, by Dr. Ronald Young, pp. 47 and 49 (Jan. 1990).
"Quantification of Heart Valve Cavitation Based on High Fidelity Pressure Measurements," *Advances in Bioengineering 1994*, Laura A. Garrison et al., BED-vol. 28, pp. 297-298 (Nov. 6-11, 1994).
"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).
"Developing Predictive Models for Cavitation Erosion," *Codes and Standards in A Global Environment*, PVP-vol. 259, pp. 189-192 (1993).
"Self-Diagnosing Intelligent Motors: A Key Enabler for Next Generation Manufacturing System," by Fred M. Discenzo et al., pp. 3/1-3/4 (1999).
"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).
"Ein Emulationssystem zur Leistungsanalyse von Feldbussystemen, Teil 1," by R. Hoyer, pp. 335-336 (1991).
"Simulatore Integrato: Controllo su bus di campo," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schrö der, pp. 557-565 (1990).
"Fault Diagnosis of Fieldbus Systems," by Jürgen Quade, pp. 577-581 (Oct. 1992).
"Ziele und Anwendungen von Feldbussystemen," by T. Pfeifer et al., pp. 549-557 (Oct. 1987).
"PROFIBUS-Infrastrukturmaßnahmen," by Tilo Pfeifer et al., pp. 416-419 (Aug. 1991).
"Simulation des Zeitverhaltens von Feldbussystemen," by O. Schnelle, pp. 440-442 (1991).
"Modélisation et simulation d'un bus de terrain: FIP," by Song et al, pp. 5-9 (undated).
"Feldbusnetz für Automatisierungssysteme mit intelligenten Funktionseinheiten," by W. Kriesel et al., pp. 486-489 (1987).
"Bus de campo para la inteconexión del proceso con sistemas digitales de control," Tecnología, pp. 141-147 (1990).
"Dezentrale Installation mit Echtzeit-Feldbus," Netzwerke, Jg. Nr.3 v. 14.3, 4 pages (1990).
"Process Measurement and Analysis," by Liptak et al., Instrument Engineers' Handbook, Third Edition, pp. 528-530, (1995).
"Improving Dynamic Performance of Temperature Sensors With Fuzzy Control Techniques," by Wang Lei et al., pp. 872-873 (1992).
U.S. Appl. No. 10/893,144, filed Jul. 2004, Brown et al.
"Notification of Transmittal of The International Search Report or the Declaration", PCT/US2004/017300.

\* cited by examiner

ROOT CAUSE DIAGNOSTICS

The present application is a Continuation-In-Part of and claims priority of U.S. patent application Ser. No. 09/303,869, filed May 3, 1999, which is a Divisional of application Ser. No. 08/623,569, filed Mar. 28, 1996, now U.S. Pat. No. 6,017,143 the contents of which are hereby incorporated by reference in their entirety.

BACKGROUND OF THE INVENTION

The present invention relates to industrial process controls and process control loops. More specifically, the invention relates to diagnostics of such loops.

Process control loops are used in process industries to control operation of a process, such as an oil refinery. A transmitter is typically part of the loop and is located in the field to measure and transmit a process variable such as pressure, flow or temperature, for example, to control room equipment. A controller such as a valve controller is also part of the process control loop and controls position of a valve based upon a control signal received over the control loop or generated internally. Other controllers control electric motors or solenoids for example. The control room equipment is also part of the process control loop such that an operator or computer in the control room is capable of monitoring the process based upon process variables received from transmitters in the field and responsively controlling the process by sending control signals to the appropriate control devices. Another process device which may be part of a control loop is a portable communicator which is capable of monitoring and transmitting process signals on the process control loop. Typically, these are used to configure devices which form the loop.

Various techniques have been used to monitor operation of process control loops and to diagnose and identify failures in the loop. However, it would also be desirable to identify the source or "root cause" of a failure, such as by identifying a particular device or component in the system which is the source of an aberration in process operation. This would provide additional information to an operator as to which device in the process needs repair or replacement.

SUMMARY OF THE INVENTION

In various aspects, an industrial process diagnostic apparatus is provided which can identify a source, or "root cause", of an aberration in an industrial process. In one aspect, the apparatus includes a plurality of process configuration models and each model is related to a physical (or actual) implementation of an industrial process. One of the plurality of models can be selected and diagnostics performed using the selected model and at least one process signal related to the process. Based upon the diagnostics, a root cause of the aberration is determined.

DETAILED DESCRIPTION OF THE PREFERRED EMBODIMENTS

Figure 1:
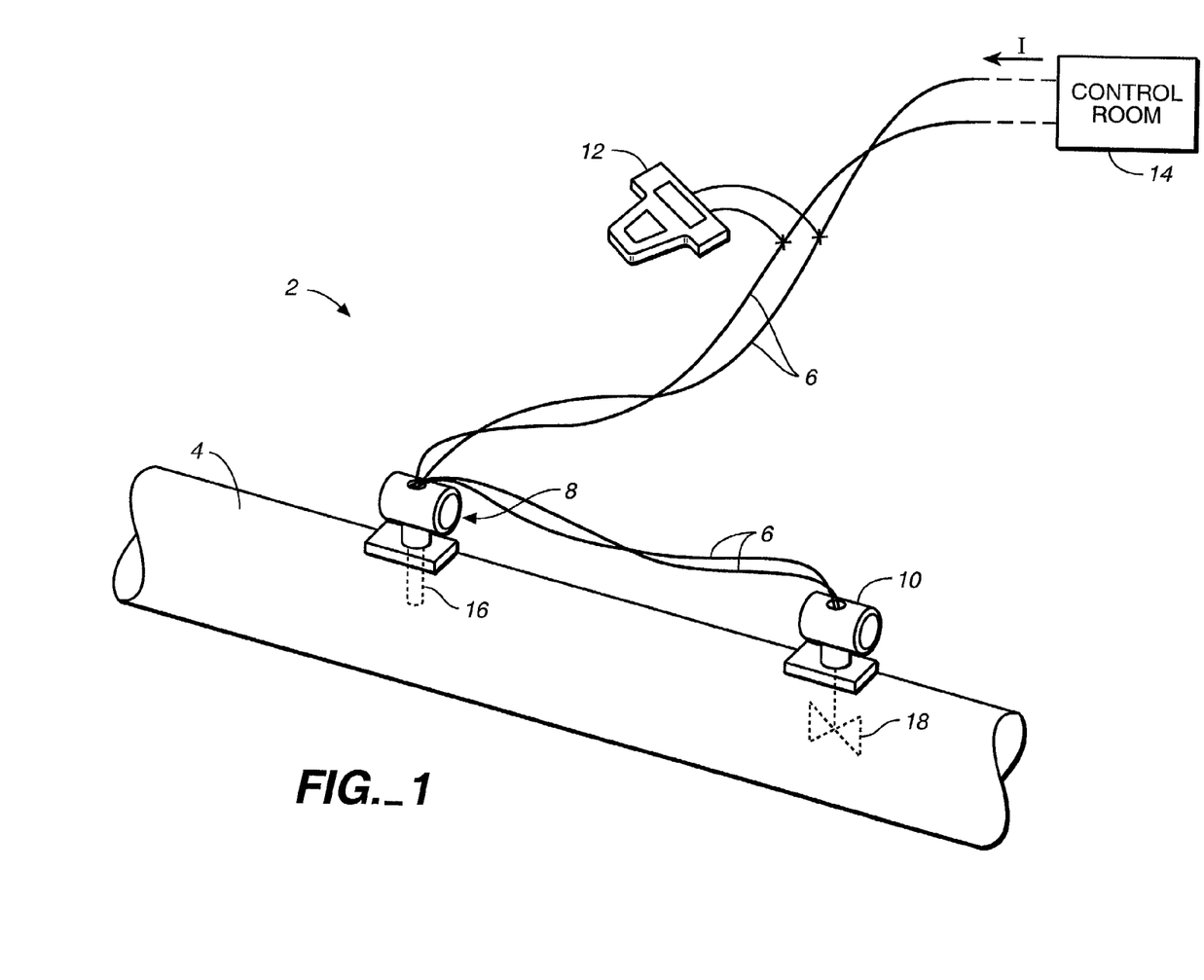
FIG. 1 is a simplified diagram showing a process control loop including a transmitter, controller, hand-held communicator and control room.

The present invention can be used with industrial processes to identify the "root cause" of an aberration which occurs in the process. FIG. 1 is a diagram showing an example of an industrial process control system 2 used to control flow of process fluid system 2 includes process piping 4 which carries a process fluid and two wire process control loop 6 carrying loop current I. A transmitter 8, controller 10, which couples to a final control element in the loop such as an actuator, valve, a pump, motor or solenoid, communicator 12, and control room 14 are all part of process control system 2. If an aberration occurs in the operation of the process, the present invention can be used to identify the cause of the observed aberration.

Loop 6 is shown in one configuration for illustration purposes and any appropriate process control loop may be used such as a 4–20 mA loop, 2, 3 or 4 wire loop, multi-drop loop and a loop operating in accordance with the HART®, Fieldbus or other digital or analog communication protocol. In operation, transmitter 8 senses a process variable such as flow using sensor 16 and transmits the sensed process variable over loop 6. The process variable may be received by controller/valve actuator 10, communicator 12 and/or control room equipment 14. Controller 10 is shown coupled to valve 18 and is capable of controlling the process by adjusting valve 18 thereby changing the flow in pipe 4. Controller 10 receives a control input over loop 6 from, for example, control room 14, transmitter 8 or communicator 12 and responsively adjusts valve 18. In another embodiment, controller 10 internally generates the control signal based upon process signals received over loop 6. Communicator 12 may be the portable communicator shown in FIG. 1 or may be a permanently mounted process unit which monitors the process and performs computations. Process devices include, for example, transmitter 8 (such as a 3095 transmitter available from Rosemount Inc.), controller 10, communicator 12 and control room 14 shown in FIG. 1. Another type of process device is a PC, programmable logic unit (PLC) or other computer coupled to the loop using appropriate I/O circuitry to allow monitoring, managing, and/or transmitting on the loop.

Figure 2:
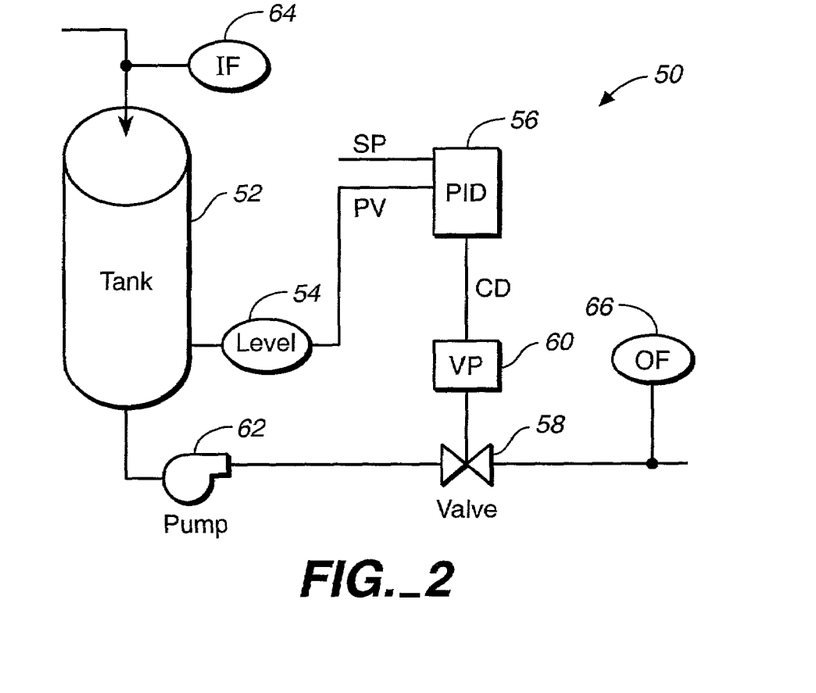
FIG. 2 is a schematic diagram of a process control loop model for a liquid level loop.

FIG. 2 is a simplified diagram 50 of a graphical model of a process control loop 50 for controlling the level of liquid in a tank 52. As discussed below, such models can be selected and used to diagnose a root cause of an aberration in process operation. A level transmitter 54 measures the level of liquid in tank 52 and provides a primary process variable (PV) to a controller 56. Controller 56 as illustrated is a PID controller, however, it can be any type of controller. Controller 56 also receives a setpoint (SP) which is related to a desired level for the liquid within tank 52. Using a known control algorithms, controller 56 provides a control demand (CD) output to a valve 58. An optional valve position sensor 60 can be used to measure the actual position of the valve stem of valve 58. Other optional components for this particular example model include a pump 62 configured to draw liquid from tank 52, a transmitter 64 configured to measure the inlet flow rate and a transmitter 66 configured to measure the outlet flow rate. As described below, the models and optional components for a model are stored in a memory and can be selected by an operator or other selection technique. In various aspects, the memory can be located or accessible to any device which couples to the process or has access to process signals.

It is preferable to perform the diagnostics of the present invention on the process control system after the operation of the process has settled and is in a steady state mode. This is ensured by observing the mean and standard deviation of process signals. The mean ($\mu$) and standard deviation ($\Sigma$) of each of the process signals (such as process variables and control signals) are evaluated for a set of N measurements, the mean and standard deviation can be evaluated as follows:

$$\mu = \frac{1}{N}\sum_{i=1}^{N} X_i \quad \text{EQ. 1}$$

$$\sigma = \sqrt{\frac{1}{N-1}\sum_{i=1}^{N}(X_i - \mu)^2} \quad \text{EQ. 2}$$

The number of points, N, depends upon the duration and sampling rates of the signal. In Equations 1 and 2, $X_i$ is the value of a process signal taken at sample number i. Initially, a sampling period of ten minutes can be used with a sampling rate of one sample per second. In one example, the loop is determined to be operating in a steady state mode if the process mean is 100 inH$_2$O (with 1 inH$_2$O standard deviation) and the subsequent process means are between 97 inH$_2$O and 103 inH$_2$O. One patent which is related to determination of process stability prior to initiating diagnostics in U.S. Pat. No. 6,119,047, issued Sep. 12, 2000, which is incorporated herein by reference in its entirety.

Once steady state operation has been reached, it is also desirable to discard data transients or spikes. One technique to identify such data is by successively comparing the signal mean with the signal standard deviation. The difference in the mean between two successive blocks of data ($\mu_1$ and $\mu_2$) should be less than the standard deviation divided by the square root of N, the number of samples. This can be expressed as:

$$\mu_1 - \frac{\sigma_1}{\sqrt{N}} \leq \mu_2 \leq \mu_1 + \frac{\sigma_1}{\sqrt{N}} \quad \text{EQ. 3}$$

where $\mu$ is the mean of the previous block, $\mu_2$ is the mean of the current block, N is the number of points in a block, and $\sigma_1$ is the standard deviation of the previous block.

Depending on the process signals which are available for performing diagnostics and used with the model, different root causes can be identified. For example, in the case of the process model shown in FIG. 2, there are three different cases:

TABLE 1

| Case | Available Signals | Monitored Faults |
|---|---|---|
| 1 | SP | Level Sensor Drift |
|   | PV | Valve Problem |
|   | CD |   |
| 2 | SP | Level Sensor Drift |
|   | PV | Valve Problem |
|   | CD |   |
|   | VP |   |

TABLE 1-continued

| Case | Available Signals | Monitored Faults |
|---|---|---|
| 3 | SP | Level Sensor Drift |
|   | PV | Valve Problem |
|   | CD | Liquid Leak |
|   | VP |   |
|   | IF |   |
|   | OF |   |

During an initial training phase, all of the process signals are collected for a user selectable amount of time, for example, 20 minutes. The mean and standard deviations of the signals are evaluated. This training phase is repeated until the process enters steady state. Once the process is in steady state, trained values (i.e., "nominal values") for the mean ($\mu_t$) and standard deviation ($\sigma_t$) for each of the process signals are stored.

Additionally, prior to identifying a root cause fault, individual process signals can be evaluated to ensure that the process is operating properly. For example, the primary process variable (PV) can be evaluated. In the case of liquid level illustrated in FIG. 2:

TABLE 2

| CONDITION | FAULT |
|---|---|
| PV > 0.95 * PV_RANGE | LEVEL HIGH (TANK OVERFLOW) |
| PV < 0.05 * PV_RANGE | LEVEL LOW (TANK DRY) |

Where PV_RANGE is the range (maximum and minimum) of the level. This value can be stored in a memory accessible by the process control system when the process control system is configured or can be entered by a user. Similarly, for the control signal (CD), the following faults can be identified:

TABLE 3

| CONDITION | FAULT |
|---|---|
| CD < 5% | CONTROL WOUND DOWN |
| CD > 95% | CONTROL WOUND UP |

In the example of Table 3, it is assumed that the control demand is a percentage between 0 and 100. If available, a similar test can be performed on the valve position (VP) process signal.

During a monitoring phase, the various process signals are monitored to determine if they have undergone no change (NC), an upward deviation (U) (the mean signal is above the training mean), or a downward variation (D) (the mean signal is less than a training mean). An NC condition is determined if:

$$\mu_t - \frac{\sigma_t}{\sqrt{N}} \leq \mu \leq \mu_t + \frac{\sigma_t}{\sqrt{N}} \quad \text{EQ. 4}$$

where $\mu_t$ is the mean of the training block, $\mu$ is the mean of the current block, N is the number of points in a block, and $\sigma_t$ is the standard deviation of the training block, $\mu_t$ and $\Sigma_t$ are the mean and standard deviation, respectively, of the process signal stored during the training phase. N is the number of samples and $\mu$ is the current mean of the process signal.

An upward variation (U) condition is identified if:

$$\mu > \mu_t + \frac{\sigma_t}{\sqrt{N}} \qquad \text{EQ. 5}$$

where $\mu_t$ is the mean of the training block, $\mu$ is the mean of the current block, N is the number of points in a block, and $\sigma_t$ is the standard deviation of the training block.

Finally, a downward variation (D) condition is identified if:

$$\mu < \mu_t - \frac{\sigma_t}{\sqrt{N}} \qquad \text{EQ. 6}$$

where $\mu_t$ is the mean of the training block, $\mu$ is the mean of the current block, N is the number of points in a block, and $\sigma_t$ is the standard deviation of the training block.

Depending upon the number of process signals which are available, a different root cause can be identified as the source of an aberration in the process. For example, if the setpoint, primary variable and control demand process signals are available, a level sensor drift or valve related problem can be identified. An example rule base is given in Table 4:

TABLE 4

| SIGNALS | FAULT<br>Level Sensor Drift or Valve Problem |
|---|---|
| SP | NC |
| PV | NC |
| CD | U or D |

If an additional process signal is available, the actual valve position (VP), then the root cause can be more specifically identified as given in Table 5:

TABLE 5

| | FAULT | |
|---|---|---|
| SIGNALS | Level Sensor Drift | Valve Problem |
| SP | NC | NC |
| PV | NC | NC |
| CD | U or D | U or D |
| VP | U or D | NC |

Finally, if the inflow rate (IF) and outflow rate (OF) process signals are available, it is also possible to determine if there is a leak in tank 52 as shown in the rule base of Table 6:

TABLE 6

| | FAULT | | |
|---|---|---|---|
| SIGNALS | Level Sensor Drift | Valve Problem | Liquid Leak |
| SP | NC | NC | NC |
| PV | NC | NC | NC |
| CD | U or D | U or D | D |
| VP | U or D | NC | D |

TABLE 6-continued

| | FAULT | | |
|---|---|---|---|
| SIGNALS | Level Sensor Drift | Valve Problem | Liquid Leak |
| IF | NC | NC | NC |
| OF | NC | NC | D |

If the changes in the process signals do not match any of the rules set forth in Tables 4, 5 and 6, an unknown fault output can be provided. Further, these rules apply if the process 50 includes pump 62 or operates based upon a pressure differential which is used to drain tank 52.

Figure 3:
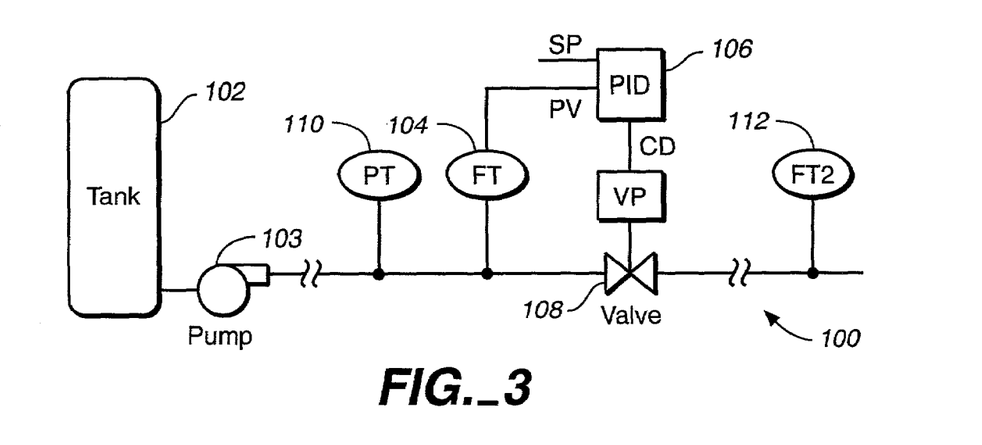
FIG. 3 is a schematic diagram of a process control loop model for a flow rate control loop.

FIG. 3 is a simplified diagram 100 of a graphical model of a process control loop to control a flow rate. This illustrates another example process control loop. In FIG. 3, a tank 102 (or a pump 103 or other source of a differential pressure) can provide a flow of process fluid. A transmitter 104 senses the flow rate and provides the primary process variable (flow rate) to controller 106. Controller 106 also receives a setpoint (SP) and provides a control demand (CD) signal to valve 108. Valve 108 may optionally report back the actual position of its valve stem (VP). Additional options include a pressure transmitter 110 configured to sense a process pressure (PT) and a redundant flow transmitter 112 configured to sense a redundant flow rate (FT2).

In operation, the mean and standard deviation are determined during a training phase in a manner similar to that described with respect to FIG. 2 and as set forth in Equations 1 and 2, above. However, because a flow rate control typically responds relatively fast, a shorter learning duration can be used, for example two minutes.

Depending upon the number of different process signals which are available, a number of different root causes can be identified as illustrated in Table 7:

TABLE 7

| Case | Available Signals | Monitored Faults |
|---|---|---|
| 1 | SP<br>PV<br>CD | Flow Sensor<br>Drift<br>Valve Problem |
| 2 | SP<br>PV<br>CD<br>VP | Flow Sensor<br>Drift<br>Valve Problem |
| 3 | SP<br>PV<br>CD<br>VP<br>FT2 | Flow Sensor<br>Drift<br>Valve Problem<br>Liquid Leak |

Prior to identifying a root cause, basic faults can be checked for. For example, using the rule base in Table 8:

TABLE 8

| CONDITION | FAULT |
|---|---|
| PT is D | HEAD LOSS |

Further, the condition of the valve can be determined as follows:

TABLE 9

| CONDITION | FAULT |
| --- | --- |
| CD < 5% | CONTROL WOUND DOWN |
| CD > 95% | CD WOUND UP |

Using additional process variables, a "root cause" of an aberration in the process can be identified. When the setpoint, primary process variable and control demand signals are available flow sensor drift or a valve problem can be identified as the root cause of the process aberration as follows:

TABLE 10

| SIGNALS | FAULT Level Sensor Drift or Valve Problem |
| --- | --- |
| SP | NC |
| PV | NC |
| CD | U or D |

If an additional process signal is available, the actual valve position (VP), then the root cause can be identified as flow sensor drift or a valve problem as follows:

TABLE 11

| | FAULT | |
| --- | --- | --- |
| SIGNALS | Flow Sensor Drift | Valve Problem |
| SP | NC | NC |
| PV | NC | NC |
| CD | U or D | U or D |
| VP | U or D | NC |

Finally, if a redundant transmitter is used to measure a second flow rate variable (FT2), then a leak in the process can also be identified:

TABLE 12

| | FAULT | | |
| --- | --- | --- | --- |
| SIGNALS | Level Sensor Drift | Valve Problem | Liquid Leak |
| SP | NC | NC | NC |
| PV | NC | NC | NC |
| CD | U or D | U or D | D |
| VP | U or D | NC | D |
| FT2 SIGNALS | U or D | NC | D |

Figure 4:
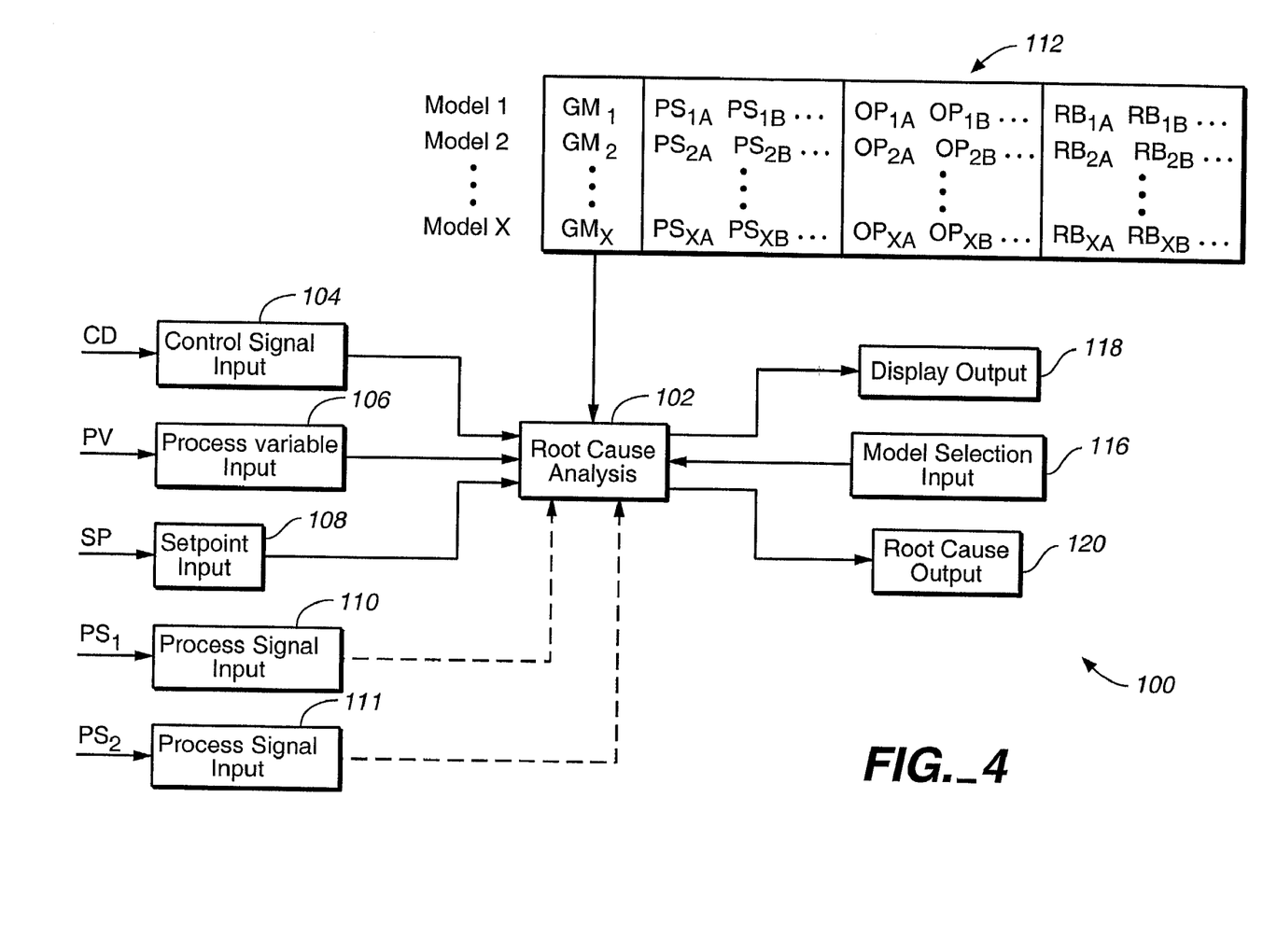
FIG. 4 is a block diagram of a device for implementing one example of the present invention.

FIG. 4 is a block diagram illustrating a process device 100 which implements one example embodiment of the present invention. Process device 100 includes a root cause analysis block 102 which receives a control signal CD through a control signal input 104, a process variable PV through a process variable input 106 and a setpoint SP through a setpoint input 108. Additional process signals ($PS_1, PS_2 \ldots$) can be received through other inputs such as process signal input 110, 111, etc. depending on the number of additional process signals which are available.

The root cause analysis block 102 is also coupled to a plurality of process configuration models 112. Models 112 can be stored, for example, in a system memory. In the embodiment illustrated, there are a total of X different models which correspond to possible process control configurations. In this example, each model includes a graphical model $GM_1 \ldots GM_x$ which provide graphical illustrations of the process. This can be used to provide a graphical user interface to facilitate entry of configuration data by an operator. For example, a graphical model can be similar to the diagrams shown in FIGS. 2 and 3.

Each process model can receive any number of process signals ($PS_{1A}, PS_{1B}$, etc.). In the specific examples shown in FIGS. 2 and 3, there are a minimum of three process signals, the control demand CD, the primary process variable PV and the setpoint SP which are required to identify the root cause of an aberration in the process. In one embodiment, the number of process signals associated with a model is the minimum number of process signals required to perform the root cause analysis, or a greater number of process signals, as desired.

Next, each model can contain any number of optional process signals ($OP_{1A}, OP_{1B}, \ldots$). Each optional process signal corresponds to a process signal ($PS_1, PS_2, \ldots$) received through inputs 110, 111, etc. In the example of FIG. 2, the valve position VP, inflow rate IF and outflow rate OF are examples of such optional process signals. Some models can be configured which have no additional optional process signals.

Next, each model contains any number of rule bases ($RB_{1A}, RB_{1B}, \ldots$) which are used to determine the root cause based upon the received process signals (the require minimum process signals $PS_{1A}, PS_{1B}, \ldots$ and any optional process signals $OP_{1A}, OP_{1B} \ldots$). Examples of rule bases are shown in Tables 4, 5, 6, 10, 11 and 12 which were discussed above. Note that the present invention is not limited to the particular use of the rule bases illustrated above to perform the root cause analysis. In one aspect, any analysis technique can be used including neural networks, other rules bases, regressive learning, fuzzy logic, and other known diagnostic techniques or techniques yet to be discovered. With the examples given here, there are a minimum of three process signals which are received, the control demand CD signal, the primary process variable PV signal and the setpoint SP signal. However, other process signals, fewer signals, or different signal combinations can be used to perform the root cause analysis.

Root cause analysis block 102 receives a model selection input 116 which is used to select one of the plurality of models 112. The model selection input can be from an operator or from another source. The model selection input 116 identifies one of the plurality of models 112 for subsequent use by root cause analysis block 102. Additionally, in one example, additional optional process (OP) signals can be selected for use with the selected model. If a graphical user interface is used, the models can include graphical models which can be displayed on a display output 118 and used in configuring the model. For example, the particular process signal can be assigned using the model selection input 116 to one of the process signals ($PS_{1A}, PS_{1B} \ldots$) or optional process signals ($OP_{1A}, OP_{1B} \ldots$) associated with a selected model. This assignment can be illustrated in a graphical form.

Once a model has been selected, the process signals used by the model rule base are assigned to the actual process signals received from the process. The root cause analysis block 102 can perform a root cause analysis using any desired technique such as those set forth above. Based upon the root cause analysis, a root cause output 120 is provided which is an indication of the root cause of an aberration of an event which has occurred in the process.

Figure 5:
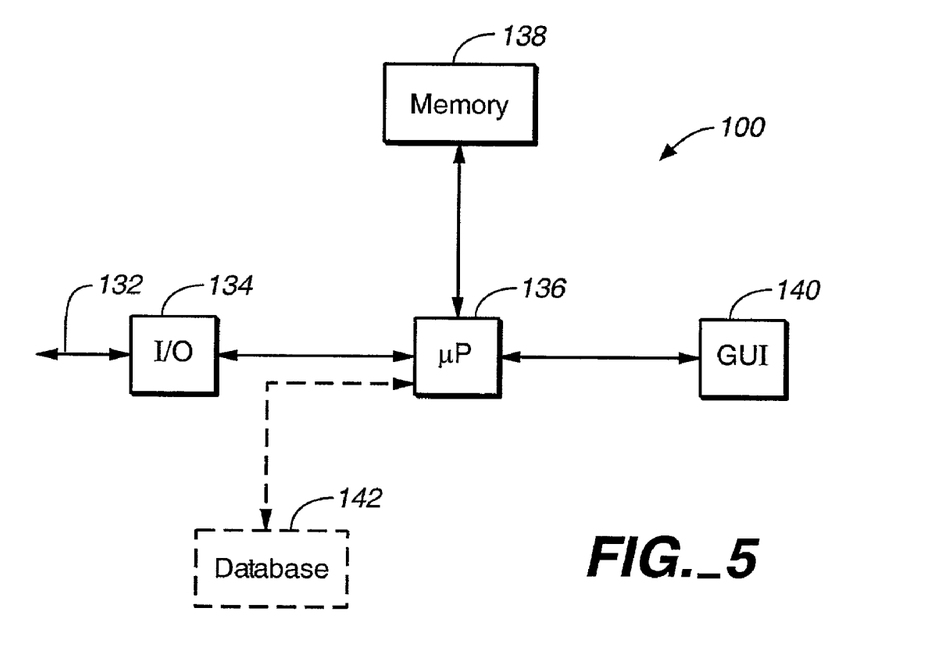
FIG. 5 is a block diagram showing one example hardware implementation of FIG. 4.

Pursuant to one embodiment of the invention, FIG. 5 is a simplified block diagram showing one physical implementation of process device 100. In the example of FIG. 5, device 100 couples to a process control loop 132 through input/output 134. Loop 132 can be, for example, the two wire loop shown in FIG. 1 or other process control loop. Further, the connection does not need to be a direct connection and can simply be a logical connection in which variables from the loop are received through a logical input/output block 134. A microprocessor 136 couples to a memory 138 and a graphical user interface 140. The memory 138 can be used to store variables and programming instructions, as well as models 112 shown in FIG. 4.

The graphical user interface 140 provides an input for receiving the model selection input 116 as well as the display output 118 of FIG. 4 for use during model selection and configuration. Microprocessor 136 can also couple to an optional database 142 which can contain information related to the configuration and operation of the process being monitored. For example, many process control or monitoring systems contain such databases. One example is the AMS system available from Rosemount Inc. of Eden Prairie, Minn.

It is appreciated that the root cause process device 100 can be implemented in any process device such as transmitters, controllers, hand-held communicators, or the control room computer shown in FIG. 1. In one embodiment, process device 100 will operate on a computer system or PC located in the control room or other remote location. Process control loop 132 will typically comprise some type of a Fieldbus based loop, or multiple control loops. In such a configuration, process device 100 can poll the desired process signals the various devices coupled to the control loop for the selected model. Although a graphical user interface 140 is shown, the model can be selected using any selection technique and does not need to be selected and configured by a human operator. For example, based upon configuration information stored in another location were provided through other techniques, the appropriate rule base and any model options can be received by device 100. Alternatively, the root cause process device 100 can be implemented in the field and reside in the transmitter for example.

As used herein, process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

Although the present invention has been described with reference to preferred embodiments, workers skilled in the art will recognize that changes may be made in form and detail without departing from the spirit and scope of the invention. Although two example processes and example models are shown in this description, the invention is applicable to other process configurations and models can be generated using known techniques or techniques discovered in the future. Further, other types of rule bases or model configurations can be used with the present invention. The invention can be implemented in a stand alone device or can be a software module which is added to software used to control or monitor industrial processes. In one aspect, the invention includes the computer instructions and/or storage media used to implement the invention. As used herein, a "process model" is any logical representation of a process and is not limited to the specific examples set forth herein. A "root cause" is the initial cause (or causes) of a variation or aberration in process operation. Other types of process control loops which can be modeled include, but are not limited to, flow control, level control, temperature control, etc., including regulator control and cascade control of gases, liquids, solids or other forms of process material. Specific examples of loops include a flow control loop with valve driven by differential pressure, a level control loop with valve driven by differential pressure, temperature regulatory control to flow regulatory control, level regulatory control to valve pump driven, flow control with valve driven by pump, level regulatory control to valve chiller condenser, level regulatory control to flow regulatory control cascade feed, liquid temperature regulatory control to valve, liquid temperature regulatory control to flow regulatory control, gas flow control with valve driven by differential pressure, gas temperature regulatory control to valve, gas pressure regulatory control to valve, gas pressure regulatory control to flow regulatory control, level regulatory control to flow regulatory control cascade reboiler, liquid pressure regulatory control to valve and level regulatory control to valve reboiler, for example. Various types of process elements which can be controlled include drums and tanks, heat exchangers, towers, steam systems, condensers, boilers, reactors, and heaters, compressors, fuel systems, turbines and flare systems, for example.

What is claimed is:

1. An industrial process diagnostic apparatus for identifying a root cause of an aberration in an industrial process, comprising:
   a plurality of process models, each model related to a physical implementation of an industrial process;
   a model selection input configured to receive a selected model, the selected model uniquely identifying one of the process models;
   a process signal input configured to receive a plurality of process signals related to the process; and a root cause output indicative of a source of the aberration in the process, the root cause output a function of the selected model and the process signals.

2. The apparatus of claim 1 including a model options input configured to receive model options related to devices which are optional in the selected model, and wherein the root cause output is further a function of the model options.

3. The apparatus of claim 2 wherein the model options comprise process signals.

4. The apparatus of claim 1 wherein each model includes a rule base.

5. The apparatus of claim 4 wherein the rule base provides a relationship between the process signals and a root cause of an aberration in the process.

6. The apparatus of claim 4 wherein each model includes a plurality of rule bases, each rule base related to the number of process signals.

7. The apparatus of claim 1 wherein the apparatus is implemented in a PC.

8. The apparatus of claim 1 wherein the apparatus is implemented in a process device.

9. The apparatus of claim 8 wherein the process device comprises a transmitter.

10. The apparatus of claim 8 wherein the process device comprises a controller.

11. The apparatus of claim 1 wherein the model includes a graphical model which provides a graphical representation of the physical implementation of the process.

12. The apparatus of claim 1 wherein the plurality of process signals comprise a primary process variable (PV), a control demand (CD) signal, and a setpoint (SP).

13. The apparatus of claim 12 wherein the plurality of process signals further includes a process signal indicative of an actual control value provided in response to the control demand (CD).

14. The apparatus of claim 1 wherein the plurality of process signals further includes a redundant primary process variable (PV).

15. The apparatus of claim 1 wherein at least one of the plurality of process models is representative of a liquid level process control loop.

16. The apparatus of claim 1 wherein at least one of the plurality of process models is representative of a process fluid flow control loop.

17. A diagnostic method in an industrial process for identifying a root cause of an aberration in an industrial process, comprising:
    selecting a process model from a plurality of process models, each model related to a physical implementation of an industrial process, the selected model uniquely identifying one of the process model wherein each model includes a rule base;
    receiving a plurality of process signals related to the process; and
    identifying a root cause indicative of a source of the aberration in the process, the identifying as a function of the selected model and the process signals.

18. The method of claim 17 including receiving model options related to devices which are optional in the selected model, and wherein identifying the root cause is further a function of the model options.

19. The method of claim 18 wherein the model options comprise process signals.

20. The method of claim 17 wherein the rule base provides a relationship between the process signals and a root cause of an aberration in the process.

21. The method of claim 17 wherein each model includes a plurality of rule bases, each rule base related to the number of process signals.

22. A PC implementing the method of claim 17.

23. A process device implementing the method of claim 17.

24. The method of claim 17 wherein the model includes a graphical model and the method including displaying a graphical representation of the physical implementation of the process.

25. The method of claim 17 wherein the plurality of process signals comprise a primary process variable (PV), a control demand (CD) signal, and a setpoint (SP).

26. The method of claim 25 wherein the plurality of process signals further includes a process signal indicative of an actual control value provided in response to the control demand (CD).

27. The method of claim 25 wherein the plurality of process signals further includes a redundant primary process variable (PV).

28. The method of claim 17 wherein at least one of the plurality of process models is representative of a liquid level process control loop.

29. The method of claim 17 wherein at least one of the plurality of process models is representative of a process fluid flow control loop.

30. A storage medium containing computer instructions configured to implement the method of claim 17.

31. An industrial process diagnostic apparatus for identifying a root cause of an aberration in an industrial process, comprising:
    means for storing a plurality of process models, each model related to a physical implementation of an industrial process;
    means for receiving a model selection input uniquely identifying one of the process models;
    means for receiving a plurality of process signals related to the process; and
    means for identifying a root cause indicative of a source of the aberration in the process as a function of the selected model and the process signals.

* * * * *